US008123166B2

(12) United States Patent
Meyer

(10) Patent No.: US 8,123,166 B2
(45) Date of Patent: Feb. 28, 2012

(54) PRIMARY STRUCTURE FOR AIRCRAFT OF COMPOSITE MATERIAL WITH IMPROVED CRASH RESISTANCE AND ASSOCIATED ENERGY-ABSORBING STRUCTURAL ELEMENT

(75) Inventor: Cedric Meyer, Fonsorbes (FR)

(73) Assignee: Airbus France, Toulouse (FR)

( * ) Notice: Subject to any disclaimer, the term of this patent is extended or adjusted under 35 U.S.C. 154(b) by 365 days.

(21) Appl. No.: 12/565,451

(22) Filed: Sep. 23, 2009

(65) Prior Publication Data
US 2010/0096501 A1      Apr. 22, 2010

(30) Foreign Application Priority Data

Sep. 25, 2008   (FR) ...................................... 08 56469

(51) Int. Cl.
*B64C 1/06*         (2006.01)
(52) U.S. Cl. ...................................................... 244/119
(58) Field of Classification Search .............. 244/117 R, 244/119, 121; 188/376–377
See application file for complete search history.

(56) References Cited

U.S. PATENT DOCUMENTS

| 3,603,638 | A | * | 9/1971 | McGregor et al. | ............ 248/429 |
| 5,069,318 | A | * | 12/1991 | Kulesha et al. | ............ 244/117 R |
| 5,152,578 | A | * | 10/1992 | Kiguchi | ........................ 188/371 |
| 2008/0210817 | A1 | * | 9/2008 | Gregg et al. | .................. 244/119 |

FOREIGN PATENT DOCUMENTS

| DE | 4313592 A1 | 10/1994 |
| DE | 4425830 A1 | 5/1995 |
| GB | 2444645 A | 6/2008 |
| WO | 2006018721 A | 2/2006 |

OTHER PUBLICATIONS

French Search Report dated May 18, 2009.

* cited by examiner

*Primary Examiner* — Galen Barefoot
(74) *Attorney, Agent, or Firm* — Perman & Green, LLP

(57) ABSTRACT

The disclosed embodiments relate essentially to a primary structure of an aircraft fuselage that has at least a first strut linked at one end to a crossbeam and at the other end to a reinforcing frame. A second strut has one end fastened to the structure below the end of the first strut, and another end linked to the first strut through an intermediate sliding linkage. A deformable member is linked to the struts so that in case of a crash, the compressive forces press against the second strut, so that the end of the second strut slides along the first strut so as to stretch the deformable member longitudinally to absorb the shock.

6 Claims, 2 Drawing Sheets

KEY:

Effort (N) = Force (N)

Durée (s) = Duration (s)

PRIMARY STRUCTURE FOR AIRCRAFT OF COMPOSITE MATERIAL WITH IMPROVED CRASH RESISTANCE AND ASSOCIATED ENERGY-ABSORBING STRUCTURAL ELEMENT

This application claims priority to French Application No. 08 56469 filed 25 Sep. 2008, the disclosures of which are incorporated herein by reference in their entireties.

BACKGROUND

1. Field

The aspects of the disclosed embodiments relate to a primary structure for aircraft of composite material with improved crash resistance and an associated energy-absorbing structural element. The specific purpose of the disclosed embodiments is to absorb the energy dissipated from a violent compressive force, in particular from a shock following an accident such as a violent landing or water landing stressing the fuselage along its vertical axis (crash with vertical component).

2. Brief Description of Related Developments

The fuselage of an aircraft includes principally a structure composed of a skin reinforced on the inside by reinforcing frames and rails. The reinforcing frames are positioned on cross sections of the fuselage essentially perpendicular to a longitudinal axis of the fuselage, while the rails extend essentially along the longitudinal axis. The reinforcing frames support crossbars that are generally straight and horizontal, in an aircraft frame of reference, to which are fastened the flooring panels.

At the time of a crash with a principal vertical component, the lower part of the fuselage is generally the first area of the aircraft subject to impacts, and it accordingly participates in the absorption of the energy from these impacts.

The certification of aircraft, in particular civil transport airplanes, imposes behavioral criteria on the fuselage in different crash situations to improve the chances of passenger survival.

For aircraft that have a fuselage structure made from structural elements (reinforcing frame, skin, rails, crossbars) of metallic material, a large amount of the energy of impact is absorbed by the plastic deformation of the metallic structural elements. Accordingly, it is generally unnecessary to provide dedicated energy-absorbing systems, since the structure passively assures the function of energy absorption because of the intrinsic properties of the metallic alloys used and a suitable design.

On the other hand, the fuselage structures made from elements of composite material have practically no plastic region before breaking, contrary to metallic structural elements. A fuselage structure of composite material accordingly behaves very differently from a fuselage structure of metallic material, with regard to the absorption of energy. Actually, after stress, either before or after breaking, the structure of composite material restores a large portion of the energy absorbed at the time of the elastic deformation.

To permit the composite structure to absorb the energy generated by the crash, a known method described in the French Application with the File Number 0850966 consists of utilizing energy-absorbing elements installed along a direction of compression of the forces to be absorbed, between the reinforcing frames and the crossbeams fastened to these frames. Each of these absorbing elements has a compression beam and a bracket, so that when the compression beam is subjected to a compressive force corresponding to the forces generated by the crash, it is pressed against the bracket provided with cutting elements that destroy the beam, so that the progressive destruction of the compression beam absorbs part of the energy of the impact.

This method is satisfactory but nevertheless rather onerous since it requires the production of appropriate energy-absorbing elements: compression beams and brackets, since they are not available as such on the market, or not readily obtainable from existing elements. It is also possible to encounter difficulties in assembly for positioning the compression beam relative to the bracket.

Accordingly, there is a need for an equivalent low-cost solution that is easy to install.

SUMMARY

Aspects of the disclosed embodiments fill this need by proposing an energy-absorbing system dependent on the use of deformable members installed in the lower part of the aircraft between the reinforcing frame and the crossbeams. Such a system provides for dissipation of all or part of the energy generated by the crash, by irreversible elongation of the deformable members. By irreversible elongation is meant a longitudinal action of partial destruction of the deformable members at the time of the crash.

It is possible to use deformable members available in commerce such as the dynamic cords used in alpinism capable of breaking a fall, or belts that have a part stitched to them intended to be fastened to a harness. Such belts are used in particular in construction for the protection of personnel.

The dynamic cords have the advantage of progressive deceleration depending on their extension, whereas the stitched belt provides for constant deceleration during the tearing, which especially satisfies the regulation JAR 25.6512 imposing maximum deceleration.

The disclosed embodiments therefore relate to a primary structure of an aircraft fuselage that has:

at least one reinforcing frame that extends along a cross section of the aircraft essentially perpendicular to its long dimension, and at least one crossbeam fastened to the reinforcing frame, wherein it also has:

at least a first strut linked at one end to the crossbeam and at the other end to the reinforcing frame, at least a second strut that has one end fastened to the structure below the end of the first strut fastened to the reinforcing frame, and another end linked to the first strut through an intermediate sliding linkage, and a deformable member able to absorb energy by irreversible elongation, with this deformable member further comprising one end fastened to the end of the first strut fastened to the reinforcing frame, and another end fastened to the end of the second strut linked to the first strut by the sliding linkage, so that in case of a crash, the compressive forces press against the second strut, so that the end of this second strut slides along the first strut so as to stretch the deformable member longitudinally to absorb the shock.

According to an embodiment, the first strut is oriented along the direction of the compressive forces to be absorbed during the shock.

According to an embodiment, the end of the second strut situated beneath the end of the first strut is fastened to the reinforcing frame or to a structural element of the bay.

According to an embodiment, the deformable member is made up of a stitched belt or dynamic cords.

According to an embodiment, the stitched belt is a belt of the "Bacou Dalloz" type that has a width of 260 mm or is formed of five belts, each with a width of 50 mm.

The disclosed embodiments also relate to an energy-absorbing structural element, wherein it has:

at least a first strut intended to be linked at one end to a reinforcing frame of an aircraft that extends along a cross section essentially perpendicular to the long dimension of the aircraft, and at another end to a crossbar fastened to the reinforcing frame, at least a second strut that has one end intended to be fastened to the structure of the aircraft beneath the end of the first strut fastened to the reinforcing frame, and another end linked to the first strut through an intermediate sliding linkage, a deformable member able to absorb energy by irreversible elongation, with this deformable member further comprising one end fastened to the end of the first strut fastened to the reinforcing frame, and another end fastened to the end of the second strut linked to the first strut by the sliding linkage, so that in case of a crash, the compressive forces press against the second strut, so that the end of this second strut slides along the first strut so as to stretch the deformable member longitudinally to absorb the shock.

BRIEF DESCRIPTION OF THE DRAWINGS

The disclosed embodiments will be better understood by reading the following description and examining the figures that accompany it. These figures are given only by way of illustration but do not limit the disclosed embodiments in any way. They show.

The identical elements retain the same reference from one figure to the others.

DETAILED DESCRIPTION

Figure 1A:
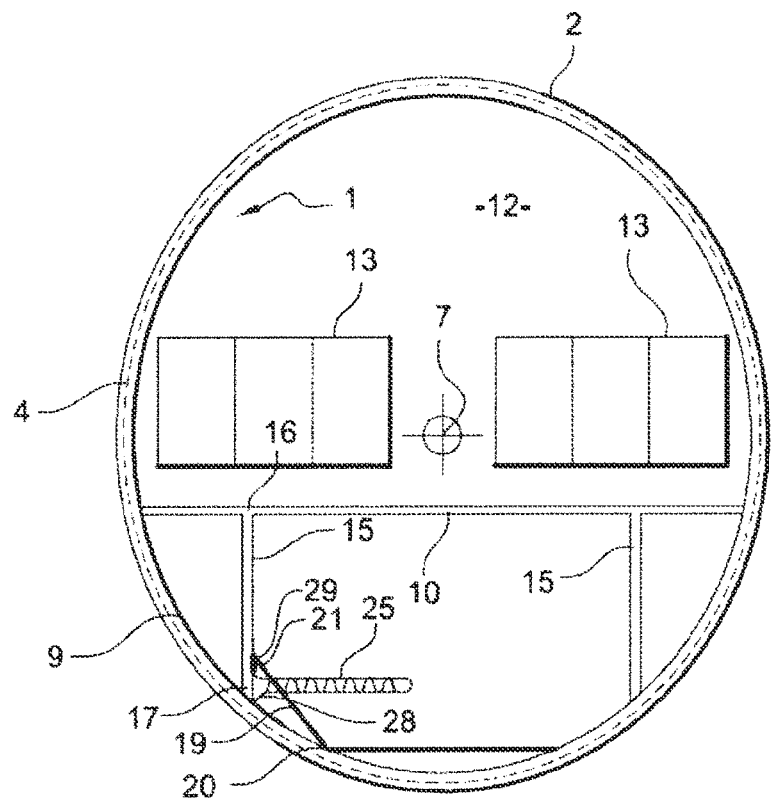
FIGS. 1a and 1b: a schematic representation of a primary aircraft structure according to the disclosed embodiments equipped with an energy-absorbing device according to the disclosed embodiments, before and after a crash with a vertical component, respectively.

FIG. 1a shows a primary structure of an aircraft fuselage that has an essentially cylindrical skeleton 1 to which is fastened a skin 2 reinforced by rails 4 extending essentially along a longitudinal axis 7 of the primary structure 1, with this longitudinal axis 7 being perpendicular to the plane of the drawing.

The skeleton 1 is composed principally of reinforcing frames 9 positioned along cross sections of the fuselage perpendicular to the longitudinal axis 7 and spaced regularly over the entire length of the fuselage. Each of them has a shape that corresponds essentially to the local cross section of the fuselage, usually circular, at least locally, as in the example of FIG. 1a.

A crossbeam 10 that is advantageously straight and horizontal in an aircraft frame of reference is fastened to each reinforcing frame 9 so as to be able to support a floor such as the floor of a passenger cabin 12 on which seats 13 are installed. As a variant, the crossbeam 10 is intended to support the floor of a bay.

In a lower area, the fuselage also has a first strut 15, called the floor strut, linked at one end 16 to the crossbeam 10 and at the other end 17 to the reinforcing frame 9. This strut 15 is oriented along the direction of the compressive forces to be absorbed during the shock. This strut 15 is preferably rigid enough not to buckle or to buckle as little as possible in case of a crash.

A second strut 19 has one end 20 fastened to the reinforcing frame 9 beneath (in an aircraft frame of reference) the end 17 of the first strut 15, and another end 21 linked to the first strut 15 through an intermediate sliding linkage. This strut 19 is preferably also rigid enough not to buckle or to buckle as little as possible in case of a crash. As a variant, the end 17 is fastened to a structural element of the bay of the airplane.

Figure 2A:
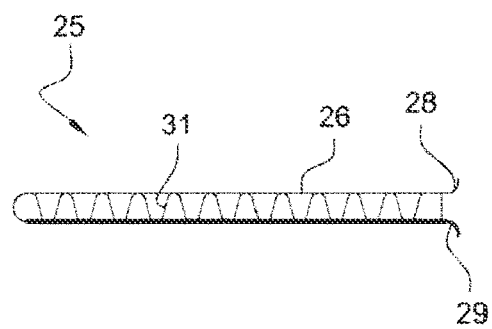
FIGS. 2a-2b: a side view and a top view of a belt used to make the energy-absorbing device according to the disclosed embodiments.
Figure 2B:
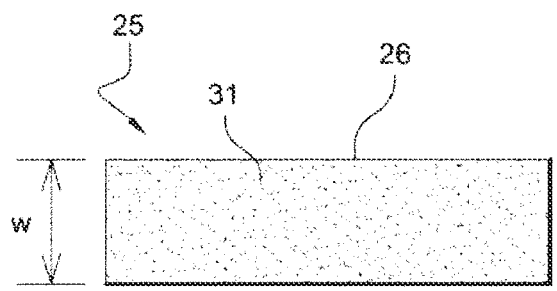

A stitched belt 25 also cooperates with the struts 15 and 19 arranged in this way. As shown in FIG. 2, this belt 25 has a band of fabric 26 folded onto itself, with the folded parts of the belt 25 being stitched to one another by a wire 31. The belt 25 has two free ends 28 and 29 opposite the folded end.

More precisely, one end 28 of the belt 25 is fastened to the fixed end 17 of the strut 15, and another end 29 is fastened to the end 21 of the strut 19 linked to the strut 15 by a sliding linkage. As a variant, the end 29 is fastened to the reinforcing frame 9 or to a part of the structure that is not susceptible to deformation in case of a crash.

Figure 1B:
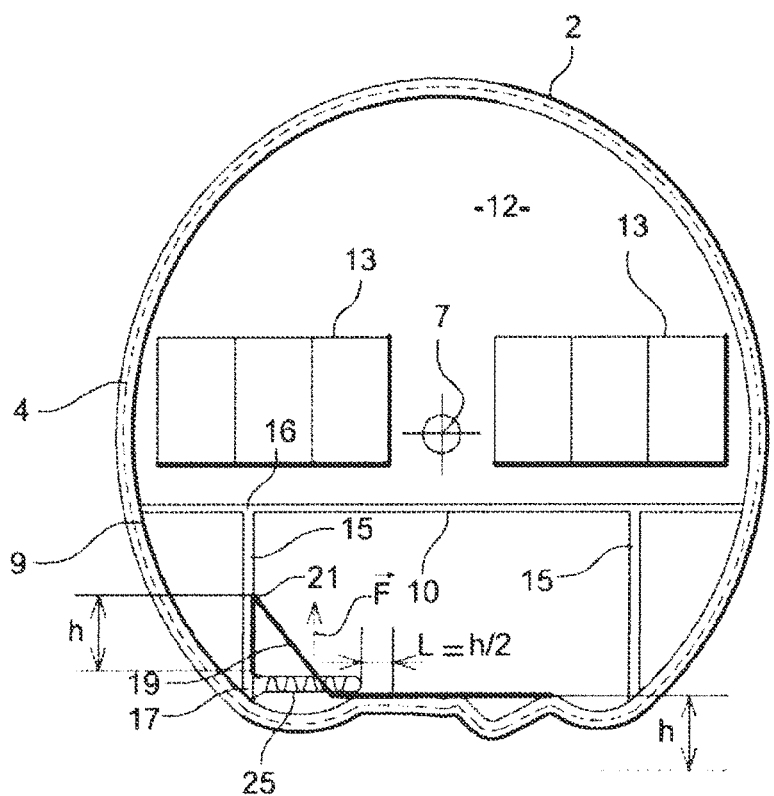

Thus, in case of a crash with a vertical component, as shown in FIG. 1b, when the reinforcing frame 9 is crushed by a height h, it pushes the strut 19 and makes the end 21 of the strut 19 slide along the strut 15, so that the end 21 pulls on the belt 25, further comprising a tendency to break the stitches, with this tearing of the seam of the belt 25 permitting it to absorb at least a portion of the energy of the crash.

It can be seen that for a crushing of the airplane of length h, generating a stretching of the belt 25 by a length h, said belt 25 has been unstitched over a length L=h/2 in proportion to the folding of the parts of the fabric on top of one another.

Figure 3:
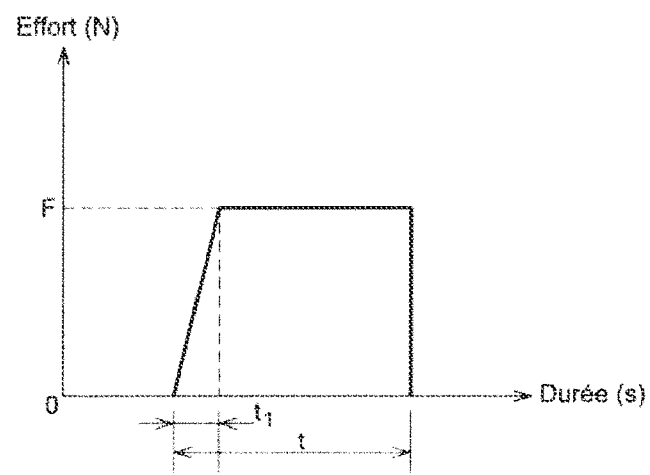
FIG. 3: a graphic representation of the force applied to the belt as a function of time during a crash.

As shown In FIG. 3, the force F necessary to unstitch the belt 25 is constant during the tearing, or in other words during the period t of crashing after the belt 25 has been placed under tension for a very short period t1. Consequently, the deceleration a is constant during the tearing (F=ma).

The force F necessary to unstitch the belt 25 is naturally proportional to the width w of the belt and to the stitch density δ corresponding to the diameter of the wire and to the number of points per unit area, and accordingly F=k·w·δ (1), with k being a coefficient of proportionality.

In case of a crash, the tearing force that has to be absorbed, assuming that 100% of the energy is dissipated by the belts 25, is equal to F=ma (2)

with a being the deceleration imposed by regulation, and
-m being the mass to be stopped.

Assuming that a stitched belt 25 is installed on each side of the fuselage, two belts 25 being installed per reinforcing frame 9, the mass to be stopped for one belt 25 is:

$$m = \tfrac{1}{2} \times (Mpass + Mfaut + Mlin \times c),$$

Mpass being the mass of the passengers supported between frames,
Mfaut being the mass of the armchairs supported between frames,
Mlin being the linear mass of the floor, and
c being the interframe spacing, the distance between two successive reinforcing frames 9.

From Equations (1) and (2) it is possible to specify the behavior of belt extension via w and δ, as a function of m and a:

$$w \cdot \delta = ma/k \qquad (3).$$

According to an embodiment, "Bacou Dalloz" (registered trademark) belts are chosen, which are used for professionals who work at heights and intended to tie the worker to a rigid structure via a harness. Tests made verify that acceleration is constant and the force absorbed is of the order of 4000 N during the rupture. This corresponds to a deceleration of 4 g for a human weighing 100 kg. The width of the belt is of the order of 50 mm. The stitch density existing on the market is accordingly:

$k\delta = ma/w$ obtained from (3), or
$k\delta = 4000/0.05 = 80,000$ kg/s$^2$.

The width of existing belt of the "Bacou Dalloz" type necessary to absorb the energy during a given crash is now calculated. In an example, assume a vertical crash speed of 22 feet/s, or 6.7 m/s, and a vertical acceleration $a=6$ g$=60$ m/s$^2$, or a crash with a duration $t=v/a=0.1$ s.

For an airplane of the "single aisle" type with 6 seats across, the total mass to be considered between frames is of the order of 700 kg: 600 kg for the passengers, 30 kg for the floor structure (A320 base), and about 10 kg per seat, we then have m=350 kg.

For a cross section of an A320 type airplane, the height of crushing h is 0.7 meter.

The force to be absorbed accordingly amounts to $F=ma=350\times60=21,000$ N, and the length to be unstitched is $L=h/2=0.35$ m.

The width of the belts 25 necessary is accordingly $w=F/k\delta$ from Formula (1), or $w=21,000/80,000=0.26$ m$=260$ mm.

A commercial belt 25 that is 50 mm wide and with an existing stitch density ($k\delta=80,000$ kg/s$^2$, see above), fastened to each floor strut 15, accordingly can dissipate about 20% of the total energy due to the crash.

To dissipate all of the energy due to the crash with existing belts 25, belts 25 with a theoretical width of 260 mm should be attached to each strut 15, or five standard belts 25 with a width of 50 mm should be attached to each strut 15.

An alternative would consist of increasing the stitch density of the existing belts 25.

The invention claimed is:

1. A primary structure of an aircraft fuselage comprising:
    at least one reinforcing frame that extends along a cross section of the aircraft essentially perpendicular to its long dimension,
    at least one crossbeam fastened to the reinforcing frame,
    at least a first strut linked at one end to the crossbeam and at the other end to the reinforcing frame,
    at least a second strut that has one end fastened to the structure below the end of the first strut fastened to the reinforcing frame, and another end linked to the first strut through an intermediate sliding linkage, and
    a deformable member able to absorb energy by irreversible elongation, with this deformable member having one end fastened to the end of the first strut fastened to the reinforcing frame, and another end fastened to the end of the second strut linked to the first strut by the sliding linkage,
    so that in case of a crash, the compressive forces press against the second strut, so that the end of this second strut slides along the first strut so as to stretch the deformable member longitudinally to absorb the shock.

2. The structure according to claim 1, characterized in that the first strut is oriented along the direction of the compressive forces to be absorbed during the shock.

3. The structure according to claim 1, wherein the end of the second strut situated beneath the end of the first strut is fastened to the reinforcing frame or to a structural element of the bay.

4. The structure according to claim 1, wherein the deformable member is formed of a stitched belt or of dynamic cords.

5. The structure according to claim 4, characterized in that the stitched belt is a belt of the "Bacou Dalloz" type that has a width of 260 mm or is formed of five belts each having a width of 50 mm.

6. A structural energy-absorbing element, comprising:
    at least a first strut intended to be linked at one end to a reinforcing frame of an aircraft that extends along a cross section essentially perpendicular to the long dimension of the aircraft, and at another end to a crossbar fastened to the reinforcing frame,
    at least a second strut that has one end intended to be fastened to the structure of the aircraft beneath the end of the first strut fastened to the reinforcing frame, and another end linked to the first strut through an intermediate sliding linkage,
    a deformable member able to absorb energy by irreversible elongation, with this deformable member having one end fastened to the end of the first strut fastened to the reinforcing frame, and another end fastened to the end of the second strut linked to the first strut by the sliding linkage,
    so that in case of a crash, the compressive forces press against the second strut, so that the end of this second strut slides along the first strut so as to stretch the deformable member longitudinally to absorb the shock.

* * * * *